United States Patent
Wakabayashi et al.

(10) Patent No.: US 6,552,977 B2
(45) Date of Patent: Apr. 22, 2003

(54) INFORMATION REPRODUCING APPARATUS ENABLING EQUALIZATION PROCESSING WITH EQUALIZATION COEFFICIENT FOR REPRODUCED INFORMATION

(75) Inventors: Kouichirou Wakabayashi, Toride (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/074,049

(22) Filed: Feb. 14, 2002

(65) Prior Publication Data

US 2002/0080696 A1 Jun. 27, 2002

Related U.S. Application Data (62) Division of application No. 09/478,343, filed on Jan. 6, 2000, now Pat. No. 6,480,447.

(30) Foreign Application Priority Data

Jan. 7, 1999 (JP) .............................. 11-001672

(51) Int. Cl.[7] .............................................. G11B 7/005
(52) U.S. Cl. ................................. 369/47.17; 369/53.33
(58) Field of Search .............................. 369/47.1, 47.17, 369/53.33, 59.15, 59.16, 47.35, 124.11, 124.12, 124.13, 47.23

(56) References Cited

U.S. PATENT DOCUMENTS

| 5,297,165 A | 3/1994 | Ueda et al. |
| 5,543,978 A | 8/1996 | Park |
| 5,572,503 A | 11/1996 | Satoh et al. |
| 5,680,380 A | 10/1997 | Taguchi et al. |
| 5,808,988 A | 9/1998 | Maeda et al. |
| 5,999,349 A | 12/1999 | Choi |

FOREIGN PATENT DOCUMENTS

| EP | 0 375 342 A2 | 6/1990 |
| JP | 5-20614 | 1/1993 |
| JP | 5-120798 | 5/1993 |
| JP | 6-290463 | 10/1994 |
| JP | 8-129789 | 5/1996 |
| JP | 9-180374 | 7/1997 |
| JP | 10-106161 | 4/1998 |
| JP | 10-112031 | 4/1998 |

OTHER PUBLICATIONS

J. Opt. Soc. Am., vol. 69, No. 1, Jan. (1979), pp. 4–24 H. H. Hopkins, Diffraction Theory of Laser Read–Out Systems for Optical Video Discs.

*Primary Examiner*—W. R. Young
*Assistant Examiner*—Gautam R. Patel
(74) *Attorney, Agent, or Firm*—Antonelli, Terry, Stout & Kraus, LLP

(57) ABSTRACT

An information reproducing apparatus for reproducing information of information marks by scanning information marks recorded on tracks inside a predetermined information recording region by an optical spot, the apparatus includes a driving device, an optical head, a head driving device, a laser driving device, an automatic gain control circuit, a non-linear equalization circuit, a phase locked loop circuit, a data demodulation circuit, and a control circuit.

3 Claims, 7 Drawing Sheets

FIG.6A (BACKGROUND)

FIG.6D

FIG.6B (BACKGROUND)

FIG.6E

FIG.6C (BACKGROUND)

FIG.7
(BACKGROUND)

INFORMATION REPRODUCING APPARATUS ENABLING EQUALIZATION PROCESSING WITH EQUALIZATION COEFFICIENT FOR REPRODUCED INFORMATION

CROSS REFERENCE TO RELATED APPLICATION

This is a divisional of U.S. application Ser. No. 09/478,343, filed Jan. 6, 2000, now U.S. Pat. No. 6,480,447 the subject matter of which is incorporated by reference herein.

BACKGROUND OF THE INVENTION

1. Field of the Invention

This invention relates to an information reproducing method for reproducing information recorded on an optical recording medium by using a laser beam, and to an apparatus for executing this method.

2. Description of the Related Art

In an optical information recording/reproducing apparatus for reproducing information marks recorded on information tracks of an optical recording medium using a laser beam, the laser beam is condensed as small as possible on the optical recording medium by using an objective lens. The minimum diameter of the optical spot formed by this means on the optical information recording medium is defined substantially as $\lambda/NA$ by the wavelength $\lambda$ of the laser beam and the numerical aperture NA of the objective lens. In order to improve the recording density of the optical recording medium, on the other hand, the arrangement gaps (mark pitch) of the information marks in the optical spot scanning direction may be reduced. When the mark pitch becomes smaller than the spot diameter, however, the optical spot radiates simultaneously parts of other adjacent information marks when it radiates a target information mark. Therefore, signals of the adjacent information marks leak to the signal of the information mark that is to be reproduced (this leak will be hereinafter referred to as "inter-symbol interference"). This interference interferes with noise components and lowers reproduction accuracy. In a system that includes a laser having a specific wavelength and an objective lens, the interference of the signals of the adjacent information marks renders a critical problem for achieving the high density.

Figure 7:
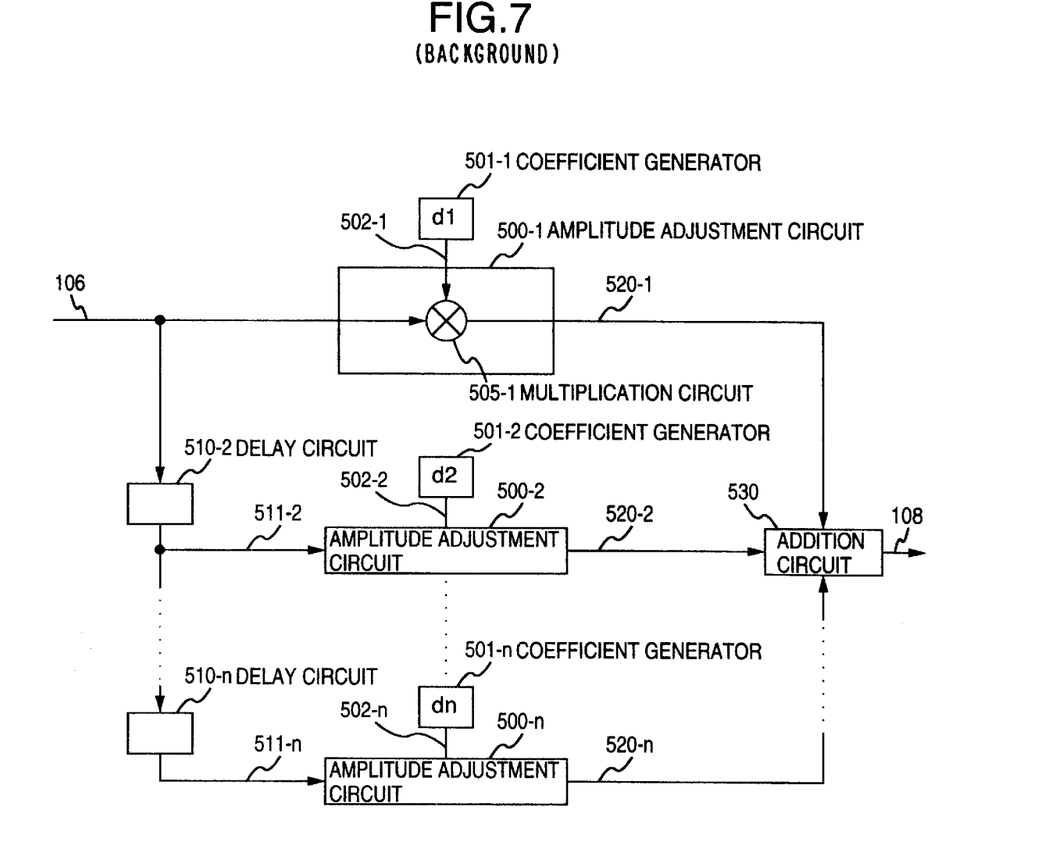
FIG. 7 is a circuit diagram showing an equalization circuit useful for explaining the related art.

A method that applies a wave form equalization processing to a reproducing signal and reduces the inter-symbol interference has been employed in the past as means for lowering the mark pitch. Hereinafter, this equalization processing method will be explained with reference to FIG. 7 that schematically shows the wave form equalization processing. A reproducing signal 104 is inputted to an amplitude adjustment circuit 500-1 and to a delay circuit 510-2. The amplitude adjustment circuit 500-1 multiplies the reproducing signal 104 by a predetermined multiple in accordance with the equalization coefficient signal 502-1 outputted from a coefficient generator 501. When the equalization coefficient signal 502-1 is C1, for example, the reproducing signal 104 is multiplied by C1 by a multiplication circuit 505-1 contained in the amplitude adjustment circuit 500-1, and is outputted as a signal-after-amplitude adjustment 520-1. On the other hand, the reproducing signal 104 inputted to the delay circuit 510-2 is delayed by a predetermined delay amount and is converted to a signal-after-delay 511-2. The equalization processing comprises a plurality of processing as shown in FIG. 7, and is therefore executed serially. In consequence, signals-after-amplitude adjustment 520-1 to 520-n, each receiving an intrinsic delay amount and an intrinsic amplitude change, are acquired. These signals-after-amplitude adjustments 520-1 to 520-n are added by an addition circuit 530 and a signal-after-equalization 108 is outputted consequently. If the equalization coefficient signal 502-1 to 502-n outputted from each coefficient generator 501-1 to 501-n is set in advance to an appropriate value, the amount of the inter-symbol interference contained in the signal-after-equalization 108 can be drastically reduced. These equalization coefficients and delay amounts are set in most cases to optimum values that are determined experimentally. Incidentally, when n=3, the processing is referred to as "3-tap equalization processing" and when n=5, "5-tap equalization processing".

Incidentally, explanation of reference numerals 500-2, 502-2, 500-n, 502-n, 510-n and 511-n will be omitted because it is the same as the explanation of the reference numerals 500-1, 502-1, 510-2 and 511-2.

The diameter of the optical spot used for reproduction is defined substantially as $\lambda/NA$ by the wavelength $\lambda$ of the laser beam and the numerical aperture NA of the objective lens, as described above. In this case, the highest temporal frequency that can be reproduced is $(4\times NA)/\lambda$. As the frequency of the highest density repetition signal recorded approaches the temporal frequency, the signal amplitude in reproduction becomes smaller, and reproduction becomes more difficult. Therefore, when the high density is achieved by reducing the mark pitch, the highest density repetition signal involves deterioration of a signal-to-noise ratio (S/N) resulting from the drop of the amplitude, and reproduction accuracy drops.

The amplitude of the highest density repetition signal can be increased generally when the inter-symbol interference is reduced by the equalization processing described above. In consequence, the S/N can be improved. However, when a higher density is attained by reducing further the mark pitch, the wave form equalization system cannot acquire a sufficient S/N improvement effect while reducing the inter-symbol interference. The result is shown in FIGS. 6A–6E. FIGS. 6A–6E show the simulation result of the reproducing signals in accordance with the Hopkins' diffraction calculation described in "J. Opt. Soc. Am.", Vol. 69, No. 1, January (1979), pp 4–24, that executes the simulation of the optical disk reproduction process in consideration of optical diffraction due to the information marks and the numerical aperture NA of the objective lens. This simulation assumes an 8–16 modulation system using a light source wavelength of 660 nm, an objective lens numerical aperture NA of 0.6, and a recording linear density on tracks of 28 $\mu$m/bit. Since a window width (Tw) is 0.14 $\mu$m in this case, the highest density repetition signal is recorded as a repetition of a pattern comprising a recording mark having a length of 0.42 $\mu$m and a non-recorded portion having a length of 0.42 $\mu$m.

Figure 6A:
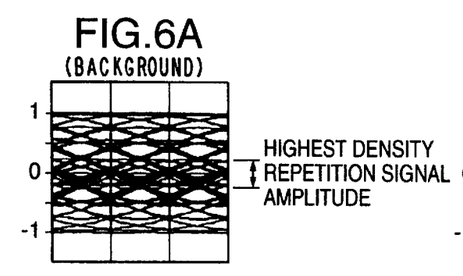
FIGS. 6A–6E are eye pattern comparison diagrams useful for explaining the features of the present invention.
Figure 6B:
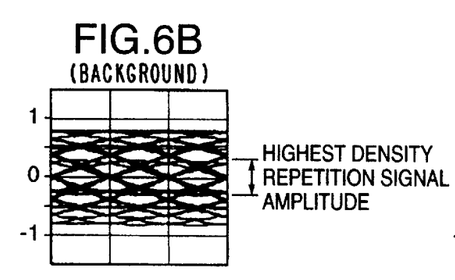
Figure 6C:
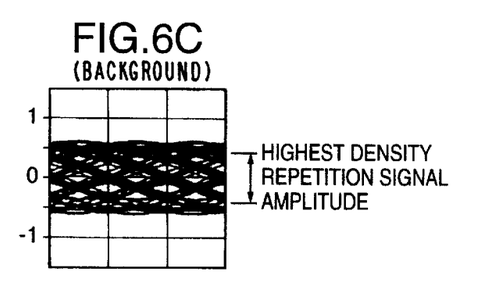

FIG. 6A shows the display of the eye pattern of the reproducing signals before processing. It can be appreciated that opening cannot be obtained sufficiently in the proximity of the slice level (level "0") due to the inter-symbol interference from the preceding and subsequent recorded marks. FIG. 6B shows the eye pattern as a result of the equalization processing of this signal. The equalization processing uses 3-tap equalization processing of n=3. The coefficients are set to d1=d3=−0.12 and d2=1.0 and the delay amount by the delay circuit is twice the window width. In consequence, the inter-symbol interference can be reduced. It can be appreciated that opening of the eye in the proximity of the slice level becomes greater than in FIG. 6A. However, the amplitude of the highest repetition signal is about ⅓ of the amplitude of the highest density repetition signal, and a sufficient S/N cannot be obtained. FIG. 6C shows the eye pattern when the coefficients are set to d1=d3=−0.30 and d2=1.0, and the amplitude of the highest density repetition signal is increased. In this case, the edge shift becomes great, and opening in the proximity of the slice level becomes small, on the contrary, though the amplitude of the highest repetition signal becomes great. As described above, the wave form equalization processing system cannot obtain a sufficient S/N improvement effect while reducing the inter-symbol interference, and the problem encountered in achieving the high density by reducing the mark pitch remains yet unsolved.

SUMMARY OF THE INVENTION

It is an object of the present invention to provide a method capable of increasing the amplitude of the highest density repetition signal while keeping the inter-symbol interference reduced and at the same time, to provide an information reproducing apparatus for accomplishing the method of the present invention.

The present invention scans information marks recorded in tracks on a recording medium by a laser beam to generate a reproducing signal, and executes an equalization processing for reducing an inter-symbol interference by serially changing equalization coefficients in accordance with the level of the reproducing signal.

In order to have the present invention more easily understood, explanation is given first on the eye patterns.

In the eye pattern shown in FIG. 6C, the equalization processing is executed using equalization coefficients that have a large absolute value in order to reduce the inter-symbol interference generated by the continuation of short marks and short non-recorded portions, and to increase the amplitude of the highest density repetition signal. At those portions in which long marks and long non-recorded portions exist, however, the reduction of the inter-symbol interference is attempted although the inter-symbol interference does not exist there from the outset. Therefore, distortion develops in the wave form with the result that the edge shift occurs. In other words, the equalization coefficient for reducing the edge shift is different between the highest density repetition signal and other signals. For this reason, the equalization processing using the equalization coefficient that is kept fixed at a predetermined value cannot increase the amplitude of the highest density repetition signal while keeping the inter-symbol interference at a low level.

Figure 5:
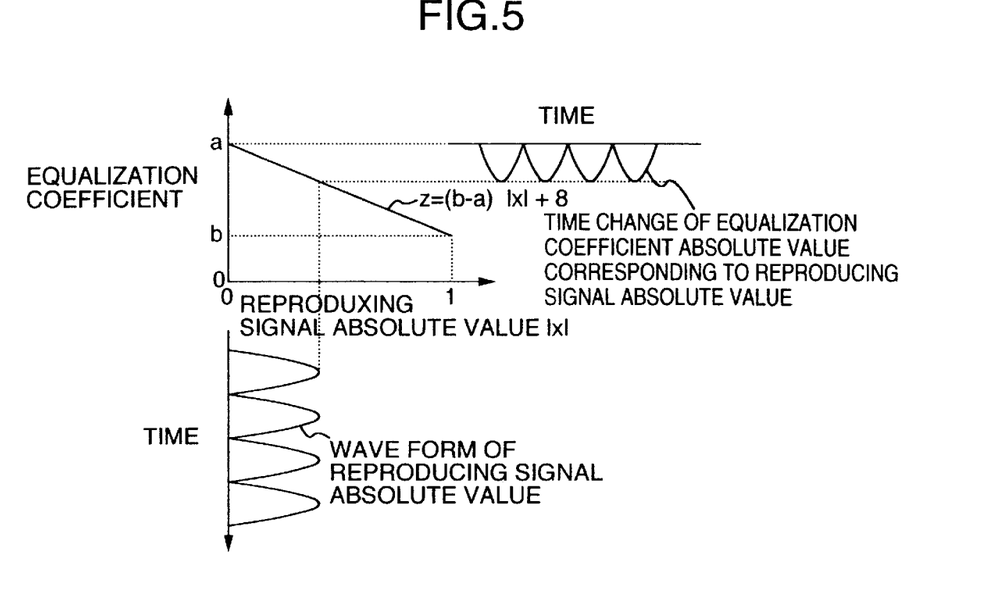
FIG. 5 is a graph useful for explaining calculation of an equalization coefficient in the present invention.

The present invention executes the equalization processing using an appropriate equalization coefficient for each signal. Hereinafter, the present system will be explained. FIG. 5 shows the relation between the absolute value of the reproducing signal and the equalization coefficient. The present system gives an appropriate equalization coefficient to each signal on the basis of this relation. The smaller the absolute value of the reproducing signal, the greater becomes the equalization coefficient. When the absolute value is 0, the equalization coefficient is a. As the absolute value of the reproducing signal becomes great, the equalization coefficient becomes small. When the absolute value of the reproducing signal attains the maximum value 1, the equalization coefficient becomes b.

When a short mark is reproduced, the absolute value of the resulting reproducing signal becomes small. When a long mark is reproduced, on the contrary, the absolute value of the resulting reproducing signal is great. In other words, according to the rule depicted in FIG. 5, a large equalization coefficient is used for a short mark. Therefore, the inter-symbol interference can be greatly reduced and the amplitude after equalization becomes greater than before. A small equalization coefficient is used for a long mark. Therefore, the amplitude after equalization does not much change than before equalization. This also holds true of the edge shift. The equalization is positively executed near the portions where the absolute value is small, that is, the portions where the inter-symbol interference is likely to occur because the mark length and the length of the non-recorded portions are small. On the other hand, the equalization is hardly executed near the portions where the absolute value is great, that is, near the portions where the inter-symbol interference is difficult to occur because the mark length and the length of the non-recorded portions are large. As a result, the waveform distortion resulting from excessive equalization can be eliminated, in principle.

DESCRIPTION OF THE EMBODIMENTS

Preferred embodiments of the present invention will be explained hereinafter with reference to the accompanying drawings. To begin with, an equalization circuit will be explained as one of the features of the present invention.

Figure 3:
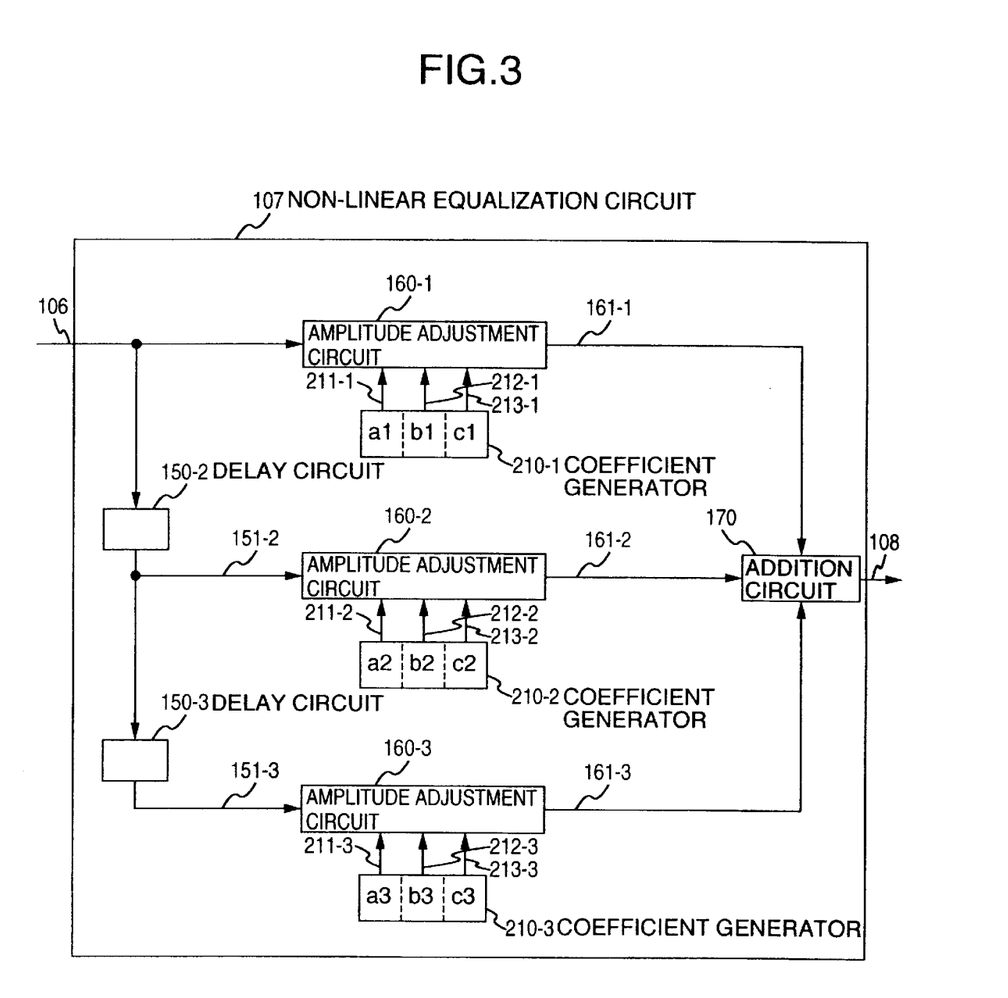
FIG. 3 is a circuit diagram showing another example of the non-linear equalization circuit that constitutes the optical information reproducing apparatus according to the present invention.
Figure 6D:
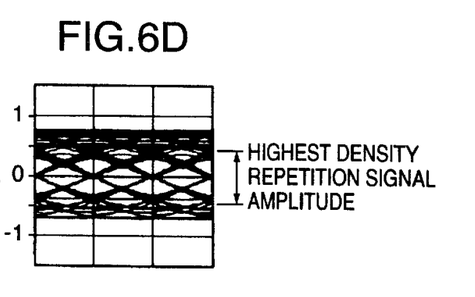

FIG. 3 is a circuit diagram showing an example of a non-linear equalization circuit 107 according to the present invention. Amplitude adjustment circuits 160-01 to 160-03 adjust the amplitude of a reproducing signal 106 in accordance with the rule shown in FIG. 5. As a result, a portion having a small amplitude is adjusted to a large amplitude and is outputted. A portion having a large amplitude is converted to a small amplitude and is outputted. Coefficient generators 210-1 to 210-3 give the maximum value a shown in FIG. 5 of coefficients a1 to a3 and give the minimum value b shown in FIG. 5 among the coefficients b1 to b3. The coefficient generators 210-1 to 210-3 output also coefficients c1 to c3 that determine the polarity of the signal that is subjected to amplitude adjustment. FIG. 6D shows the eye pattern when the coefficients a1, b1 and c1 are set to 0.4, 0.1 and −1, respectively, the coefficients a2, b2 and c2 are set to 1.0, 1.0 and +1, respectively and the coefficients a3, b3 and c3 are set to 0.4, 0.1 and −1, respectively, and the delay amount by delay circuits 150-2 to 150-3 is twice the detection window width. It can be seen that in comparison with the eye pattern obtained by the equalization processing shown in FIG. 6B, the edge shift amount remains unaltered but the amplitude of the highest density repetition signal is improved more greatly.

Incidentally, reference numerals 161-1, 161-2 and 161-3 denote signals-after-amplitude adjustment. Reference numeral 151-2 and 151-3 denote signals-after-delay. Reference numerals 211-1, 211-2 and 211-3 denote the maximum value signals of the coefficients, and reference numerals 212-1, 212-2 and 212-3 denote the minimum value signals of the coefficients. Reference numerals 213-1, 213-2 and 213-3 denote polarity signals. Reference numeral 170 denotes an addition circuit and reference numeral 108 denotes a signal-after-equalization.

Figure 4:
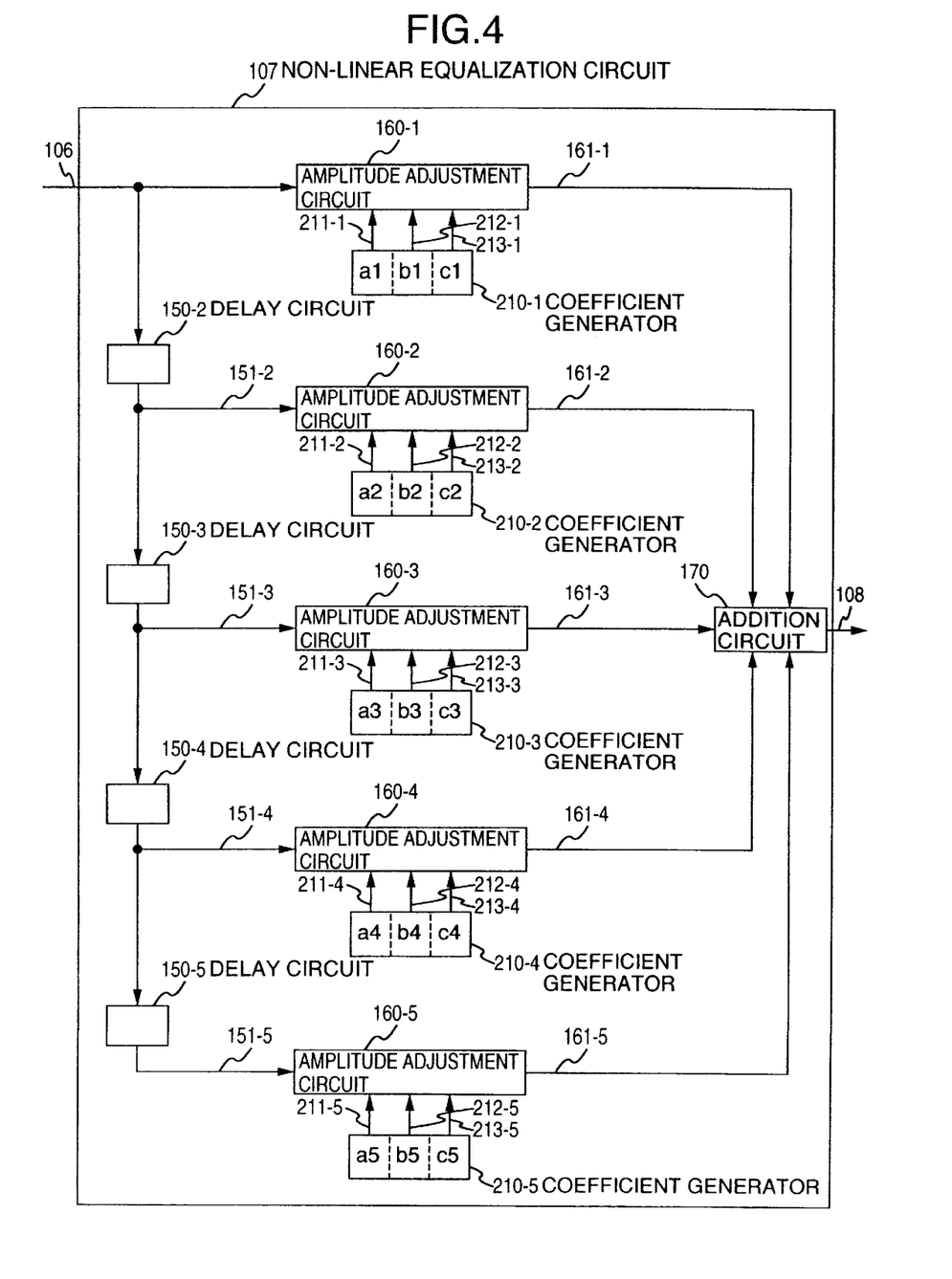
FIG. 4 is a circuit diagram showing still another example of the non-linear equalization circuit that constitutes the;optical information reproducing apparatus according to the present invention.
Figure 6E:
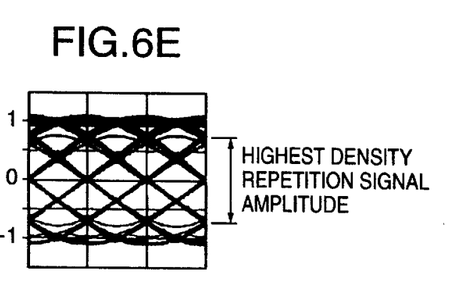

FIG. 4 shows another example of the non-linear equalization circuit 107 according to the present invention. The amplitude adjustment circuits 160-1 to 160-5 and the coefficient generators 210-1 to 210-5 function in exactly the same way as the corresponding ones shown in FIG. 3, respectively. FIG. 6E shows the eye pattern when the coefficients a1, b1 and c1 are set to 1.0, 0.3 and −1, respectively, the coefficients a2, b2 and c2 are set to 1.0, 0.8 and +1, respectively, the coefficients a3, b3 and c3 are set to 1.0, 1.0 and +1, respectively, the coefficients a4, b4 and c4 are set to 1.0, 0.3 and +1, respectively, and the coefficients a5, b5 and c5 are set to 1.0, 0.3 and −1, respectively, and the delay amount by the delay circuits 150-2 to 150-5 is set to the same amount as the detection window width. It can be seen that the amplitude of the highest density repetition signal is improved most greatly in the eye patterns shown in FIGS. 6A–6E.

Incidentally, reference numerals 161-1 to 161-5 denote signals-after-amplitude adjustment. Reference numerals 151-2 to 151-5 denote signals-after-delay. Reference numerals 211-1 to 211-5 denote the maximum values of the coefficients and reference numerals 212-1 to 212-5 denote the minimum values of the coefficients. Reference numerals 213-1 to 213-5 denote polarity signals. Reference numeral 106 denotes a reproduction signal. Reference numeral 170 denotes an addition circuit and reference numeral 108 denotes a signal-after-equalization.

As described above, when the equalization processing according to the present invention is employed, the amplitude of the highest density repetition signal can be improved without increasing the edge shift. Because the S/N can be improved eventually, the high density can be achieved by decreasing the mark pitch.

Next, an information reproducing apparatus using the non-linear equalization circuit 107 of the present invention will be explained with reference to FIG. 1.

Figure 1:
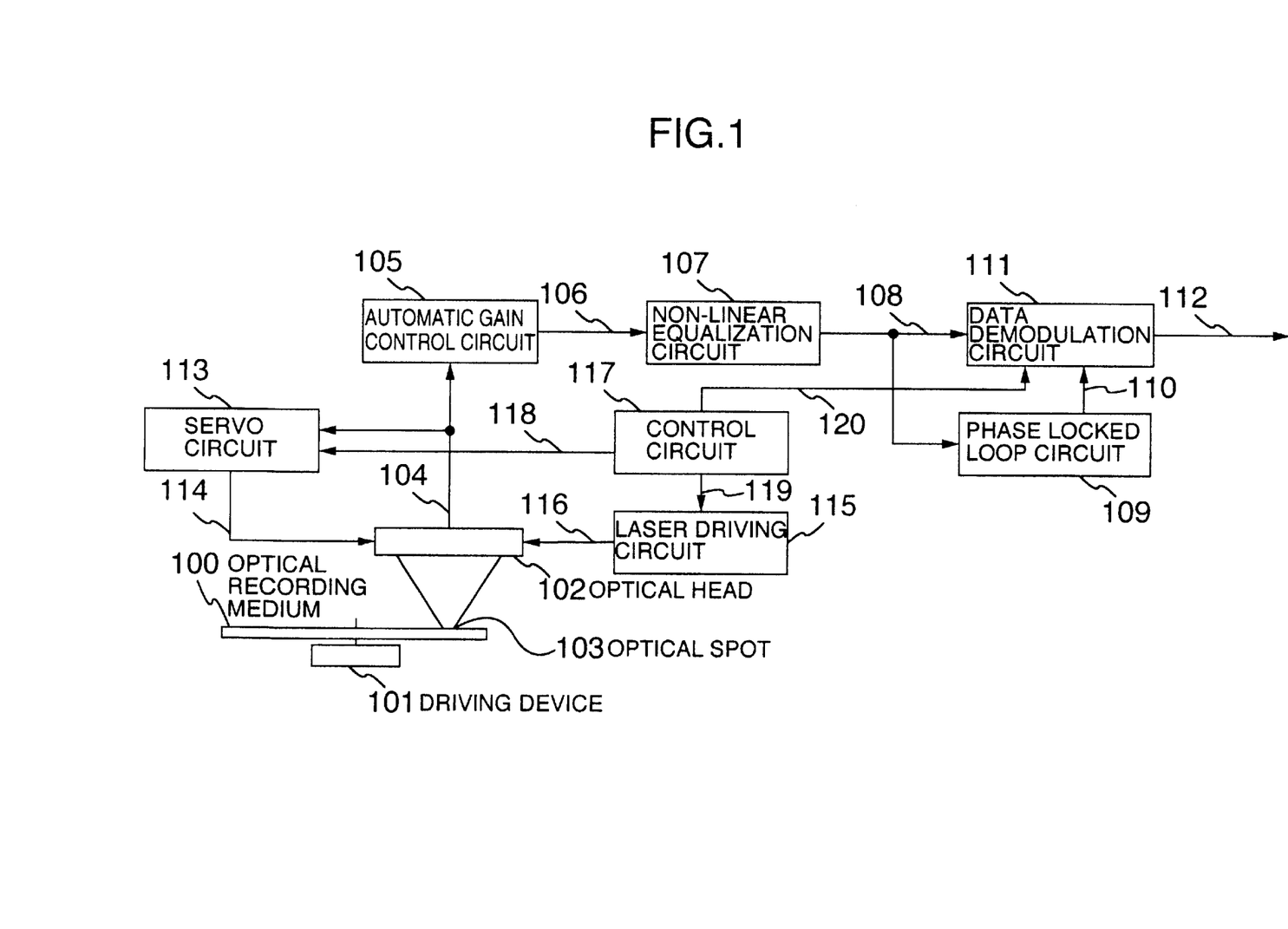
FIG. 1 is a block diagram showing an optical information reproducing apparatus according to one embodiment of the present invention.

FIG. 1 is a schematic structural view of the optical information reproducing apparatus according to the present invention.

This optical information reproducing apparatus comprises an optical recording medium 100 that is mounted to a driving device 101 and rotated, an optical head 102 that radiates an optical spot 103 to the optical recording medium 100 and reproduces the recorded information, a laser driving circuit 115 that drives the optical head 102 so that a ray of light having predetermined optical power can be outputted from the optical head 102, a servo circuit 113 that positions the optical spot 103, an automatic gain control circuit 105 that adjusts the amplitude of the reproducing signal to a predetermined amplitude on the basis of the reproducing signal 104 obtained when the optical spot 103 scans the tracks, a non-linear equalization circuit 107 that executes a signal processing for reducing inter-symbol interference by serially changing the equalization coefficients in accordance with the level of the reproducing signal the gain of which is adjusted, a phase locked loop circuit 109 that generates a clock signal in synchronism with the revolution of the optical recording medium 100 on the basis of the reproducing signal that is subjected to the equalization processing, a data demodulation circuit 111 that demodulates the reproducing signal subjected to the equalization processing in accordance with a predetermined demodulation system, and outputs a user data, and a control circuit 117 that controls the servo circuit 113, the laser driving circuit 115 and the data demodulation circuit 111.

Reference numeral 108 denotes a signal-after-equalization. Reference numeral 110 denotes a sync signal. Reference numeral 112 denotes output data. Reference numeral 114 denotes a servo signal to be applied to the optical head 102. Reference numeral 116 denotes a laser driving signal for generating the optical spot 103 from the optical head 102. Reference numeral 118 denotes a control signal to be applied from the control circuit 117 to the servo circuit 113. Reference numeral 119 denotes a control signal to be applied from the control circuit 117 to the laser driving circuit 115. Reference numeral 120 denotes a control signal to be applied from the control circuit 117 to the data demodulation circuit 111.

Figure 2:
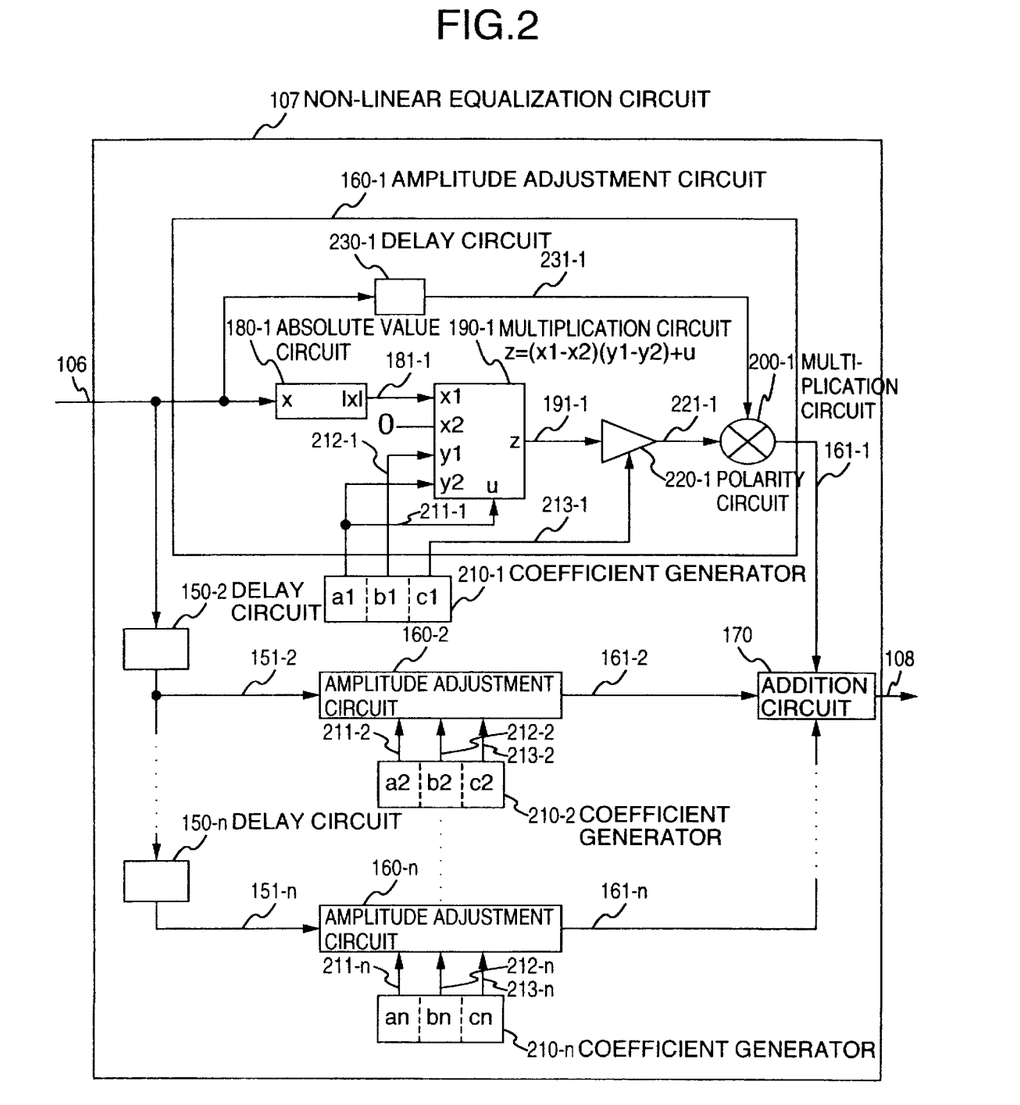
FIG. 2 is a circuit diagram showing an example of a non-linear equalization circuit that constitutes the optical information reproducing apparatus according to the present invention.

The non-linear equalization processing 107 shown in FIG. 1 will be further explained. FIG. 2 shows another example of the non-linear equalization circuit according to the present invention. This circuit comprises a plurality of amplitude adjustment circuits 160-1 to 160-n, a plurality of coefficient generators 210-1 to 210-n, a plurality of delay circuits 150-2 to 150-n, and one addition circuit 170, in the same way as the non-linear equalization circuit 107 that is explained with reference to FIGS. 3 and 4. The amplitude adjustment circuit 160-1 comprises an absolute value circuit 180-1, multiplication circuits 190-1 and 200-1, a polarity circuit 220-1 and a delay circuit 230-1.

The reproducing signal-after-gain control 106, that is inputted to the non-linear equalization circuit 107, exhibits the eye pattern such as the one shown in FIG. 6A. The signal is subjected to the amplitude adjustment by the automatic gain control circuit 105 of the pre-stage so that the maximum value of the amplitude and its minimum value reach the predetermined values. In the example shown in FIG. 6A, the amplitude adjustment is made so that the maximum value is +1 and the minimum value is −1. It will be assumed hereinafter for convenience sake that the automatic gain control circuit 105 adjusts the amplitude so that the maximum value of the reproducing signal 104 is +1 with its minimum value being −1, and outputs the reproducing signal 106 after gain control.

As shown in FIG. 2, the absolute value circuit 180-1 generates the absolute value of this reproducing signal 106 after gain control and outputs an absolute value signal 181-1.

The multiplication circuit 190-1 outputs the equalization coefficient 191-1 corresponding to the absolute value of the reproducing signal 106 on the basis of the maximum value signal 211-1 of the equalization coefficient signal and its minimum value signal 212-1 that are given by the coefficient generator 210-1. The rule for calculating the equalization coefficient z from the absolute value $|X|$ of the reproducing signal 106 may use the relationship shown in FIG. 5, for example. The value z is expressed as $z=(b-a)\times|X|+a$ by the arithmetic expression. Here, the maximum value of the equalization coefficient signal is a and its minimum value is b. The multiplication circuit 190-1 has the function of outputting $z=(x1-x2)(y1-y2)+U$ to the input terminals x1, x2, y1, y2 and U. Therefore, the rule shown in FIG. 5 can be accomplished circuit-wise by inputting the absolute value signal 181-1 to the input terminal x1, 0 to the input terminal x2, the minimum value signal 212-1 of the equalization coefficient signal to the input terminal y1, and the maximum value signal 211-1 of the equalization coefficient signal to the input terminals y2 and U.

The polarity circuit 220-1 outputs the equalization coefficient 191-1 as the equalization coefficient with polarity 221-1 when the polarity signal 213-1 given by the coefficient generator 210-1 is +1, and outputs the equalization coefficient 191-1, the polarity of which is inverted, as the equalization coefficient with polarity 221-1 when the polarity signal 213-1 is −1.

The delay circuit 230-1 has the delay amount equal to the propagation delay amount of the signal that occurs in the absolute value circuit 180-1, the multiplication circuit 190-1 and the polarity circuit 220-1, and functions in such a fashion that the signal-after-phase compensation 231-1, that adds the delay to the reproducing signal-after-gain control, and the equalization coefficient with polarity 221-1 have the same phase.

The multiplication circuit 200-1 multiplies the signal-after-phase compensation 231-1 by the equalization coefficient with polarity 221-1 and outputs the product as the signal-after-amplitude adjustment 161-1.

On the other hand, the reproducing signal-after-amplitude adjustment 106 is delayed by the delay amount set in advance by the delay circuit 150-2 and is converted to the reproducing signal-after-delay and gain adjustment 151-2. This signal is processed by the amplitude adjustment circuit 160-2 in the same way as described above, and the signal-after-amplitude adjustment 161-2 is generated. Therefore, each of the signals 161-1 to 161-n generated by each amplitude adjustment circuit is the signal to which an intrinsic delay amount and intrinsic amplitude adjustment are imparted.

The addition circuit 170 adds all of these signals-after-amplitude adjustment 161-1 to 161-n and outputs the signal-after-equalization 108. Incidentally, the values of the coefficient generators 210-1 to 210-n and the values of the delay circuit 150-2 to 150-n are set in advance so that the inter-symbol interference contained in the signal-after-equalization 108 becomes minimal.

Incidentally, reference numerals 211-2 and 211-n denote the maximum value signals of the coefficient, reference numeral 212-2 and 212-n denote the minimum value signals of the coefficient and reference numerals 213-2 and 213-n denote the polarity signals.

FIG. 3 shows an example of a 3-tap equalization circuit according to the present system. FIG. 6D shows the eye pattern when the coefficients a1, b1 and c1 in FIG. 3 are set to 0.4, 0.1 and −1, respectively, the coefficients a2, b2 and c2 are set to 1.0, 1.0 and +1, respectively, and the coefficients a3, b3 and c3 are set to 0.4, 0.1 and −1, respectively, and the delay amount by the delay circuit is twice the detection window width. It can be seen that in comparison with the eye pattern obtained by the conventional equalization processing shown in FIG. 6B, the amplitude of the highest density repetition signal can be drastically improved though the edge shift quantity remains unaltered.

Incidentally, the absolute value circuit 181-1 shown in FIG. 2 determines the absolute value |X| as the size of the reproducing signal. The difference is likely to occur as a mean DC level in the case where the detection window width is the highest density reproducing signal (3Tw) or the lowest density reproducing signal (11Tw), if the mean DC level of the highest density reproducing signal (eTw) is an asymmetry $X_0$ as positioned at a central or maximum amplitude, but the eye pattern shown in FIG. 6E can be obtained when the absolute value circuit 181-1 is so constituted as to determine the absolute value $|x-x_0|$.

FIG. 4 shows an example of a 5-tap non-linear equalization circuit according to the present system. FIG. 6E shows the eye pattern when the coefficients a1, b1 and 1 in FIG. 4 are set to 1.0, 0.3 and −1, respectively, the coefficients a2, b2 and c2 are set to 1.0, 0.3 and +1, respectively, the coefficients a3, b3 and c3 are set to 1.0, 1.0 and +1, respectively, the coefficients a4, b4 and c4 are set to 1.0, 0.3 and +1, and the coefficients a5, b5 and c5 are set to 1.0, 0.3 and −1, respectively, and the delay amount by the delay circuit is equal to the detection window width. It can be seen that the amplitude of the highest repetition signal is improved most greatly in each eye pattern shown in FIGS. 6A–6E.

As described above, the amplitude of the highest density repetition signal can be increased according to the equalization processing of the present invention without increasing the edge shift. Because the S/N can be eventually improved, high reliability can be secured and the high density can be achieved even when the mark pitch is reduced.

The information reproducing apparatus explained in the foregoing embodiments can be applied to both the analog system and the digital system.

The present invention applies the signal processing, that reduces the inter-symbol interference by serially changing the equalization coefficients in accordance with the level of the reproducing signals, to the reproducing signals, and can increase the amplitude of the highest density repetition signal without increasing the edge shift. Therefore, since the S/N can be improved, high reliability can be secured even when the mark pitch is decreased, and the high density can be achieved. Additionally, the equalization processing according to the present invention can be applied to not only the phase-change optical disk but also the opto-magnetic disk.

What is claimed is:

1. An information reproducing apparatus for reproducing information of information marks by scanning said information marks recorded on tracks inside a predetermined information recording region by an optical spot, comprising:

a driving device for rotating an optical recording medium;

an optical head for radiating said optical spot on said information marks to read out the information of said information marks on said optical recording medium, detecting an optical change by said information mark and outputting an optical change signal;

a head driving device for relatively driving said optical head to said optical recording medium so that said optical spot scans said information marks;

a laser driving device for controlling said optical spot outputted from said optical head;

an automatic gain control circuit for regulating the amplitude of said optical change signal detected by said optical head to a predetermined amplitude;

a non-linear equalization circuit for executing an equalization processing for reducing an inter-symbol interference contained in said optical change signal subjected to the gain control;

a phase locked loop circuit for generating a sync signal in synchronism with the revolution of said optical recording medium on the basis of said optical change signal subjected to said equalization processing;

a data demodulation circuit for demodulating said optical change signal subjected to said equalization processing in accordance with a predetermined polarity rule on the basis of said sync signal; and a control circuit for controlling each of said functions;

wherein said non-linear equalization circuit comprises a plurality of amplitude adjustment circuits for adjusting the amplitude of said optical change signal subjected to said gain control; and wherein said amplitude adjustment circuit includes:

an absolute value generation circuit for generating an absolute value $|x|$ of the size of said optical change signal subjected to said gain control;

a coefficient generator for outputting a polarity coefficient determining a maximum coefficient, a minimum coefficient and a polarity in association with the maximum value and the minimum value of the amplitude of said optical change signal adjusted by said automatic gain control circuit;

a first multiplication circuit for generating said equalization coefficient corresponding to said absolute value $|x|$ on the basis of said maximum coefficient and said minimum coefficient given by said coefficient generator;

a polarity circuit for generating an equalization coefficient with polarity giving a polarity to said equalization coefficient, by receiving said equalization coefficient from said multiplication circuit and said symbol coefficient from said coefficient generator; and a second multiplication circuit for generating an amplitude-adjusted signal from said optical change signal subjected to gain control after delay and from said equalization coefficient with sign.

2. An information reproducing apparatus according to claim 1, wherein said absolute circuit generates an absolute value $|x-x_0|$ that reflects an asymmetry $x_0$ of said highest density signal on the absolute value $|x|$ of the magnitude of said optical change signal subjected to said gain control.

3. An information reproducing apparatus according to claim 1, wherein said first multiplication circuit generates an equalization coefficient corresponding to said absolute value $|x-x_0|$ on the basis of said maximum coefficient and said minimum coefficient given by said coefficient generator.

* * * * *